United States Patent [19]

Moore

[11] Patent Number: 4,824,132

[45] Date of Patent: Apr. 25, 1989

[54] EXERCISING DEVICE FOR USE WITH A WHEELCHAIR

[76] Inventor: Jonie M. T. Moore, 1455 W. 120th St., Los Angeles, Calif. 90047

[21] Appl. No.: 145,105

[22] Filed: Jan. 19, 1988

Related U.S. Application Data

[63] Continuation-in-part of Ser. No. 809,265, Dec. 16, 1985, abandoned.

[51] Int. Cl.[4] .............................................. B62M 1/14

[52] U.S. Cl. .............................. 280/304.1; 280/250.1; 272/73; 297/DIG. 4

[58] Field of Search ............... 280/289 WC, 242 WC, 280/233, 234; 272/73; 297/DIG. 4

[56] References Cited

U.S. PATENT DOCUMENTS

| | | | |
|---|---|---|---|
| 3,423,086 | 1/1969 | Moore | 280/289 WC |
| 4,071,235 | 1/1978 | Zent | 272/73 |
| 4,264,085 | 4/1981 | Volin | 280/289 WC |
| 4,316,616 | 2/1982 | Boivin | 280/289 WC |
| 4,572,501 | 2/1986 | Dorhagn et al. | 280/242 WC |
| 4,572,502 | 2/1986 | Messineo | 272/73 |

*Primary Examiner*—Charles A. Marmor
*Assistant Examiner*—Donn McGiehan
*Attorney, Agent, or Firm*—Robert J. Schaap

[57] ABSTRACT

An exercising device for use with the frame of a wheelchair and which comprises a cross-bar having an adjustable length and capable of being connected to the opposite sides of the frame of a wheelchair. The cross-bar is comprised of a pair of cross-bar sections pivotally connected intermediate their ends so that if the wheelchair itself is of a foldable construction, the wheelchair may be collapsed or folded with the cross-bar attached. A connecting arm is provided for pivotally connecting the cross-bar to a crankable assembly. The crankable assembly comprises a hand operated crank mechanism and a foot operated crank mechanism. Moreover, a stand is provided on the crankable assembly so that a driven wheel of this assembly can be elevated for enabling exercising by operation of each or both of the crank assemblies and which wheel can be lowered to the ground for causing propelling movement of the wheelchair.

22 Claims, 2 Drawing Sheets

EXERCISING DEVICE FOR USE WITH A WHEELCHAIR

RELATED APPLICATION

This application is a continuation-in-part of my co-pending U.S. application Ser. No. 809,265, filed Dec. 16, 1985, and now abandoned.

BACKGROUND OF THE INVENTION

1. Field of the Invention

This invention relates in general to certain new and useful improvements in an exercising device for use with wheelchairs and more particularly, to an exercising device which has a unique attachment means which enables folding of the wheelchair, which enables movement of the exercising device away from a portion where it is aligned with the wheelchair to permit easy entry and exit from the wheelchair, and which also permits the exercising device to operate as a propelling mechanism.

2. Brief Description of the Prior Art

It has been recognized that many patients who utilize wheelchairs are not totally incapacitated in their lower limbs. In like manner, patients, whether or not fully handicapped in the lower limbs still have the full capacity of use of their upper limbs. In either case, for all patients in wheelchairs, it is necessary to exercise the cardiovascular system, and to the extent the limbs are usable, to exercise those limbs, as well.

There have been numerous proposed devices for attachment to the frame of a wheelchair to enable exercising by the user of the wheelchair. My prior U.S. Pat. No. 3,423,086 dated Jan. 21, 1969 provides an excellent mechanism for enabling exercising for a patient. The present invention, however, provides many advantages which overcome some of the limitations which may have been inherent in the device described in the aforesaid U.S. Pat. No. 3,423,086, as well as other prior art mechanisms.

One of the principle problems encountered in the use of exercising devices for attachment to the frame of the wheelchair is that the exercising device only permits exercising by the user of the wheelchair. There is no device which is capable of also being used simply and easily to cause propelling movement of the wheelchair, as well. Thus, it would desirable to have an arrangement whereby the user of the wheelchair is capable of obtaining the necessary exercise as well as causing a propelling movement of the wheelchair through the exercising device.

Another one of the problems encountered in these prior art exercising devices is the fact that the exercising device is located immeditely in the front of the wheelchair. This materially inhibits engry into and exit from the wheelchair. As a result, in many of these prior art devices, it was necessary to remove the exercising device in order to facilitate entry of the patient into the wheelchair and in order to facilitate removal of the patient from the wheelchair. This was not only time consuming, but oftentimes militated against the use of the exercising device.

A further problem encontered in connection with the various prior art exercising devices is the fact that the exercising device is not easily and readily attached to the wheelchair. In many cases, the wheelchair itself is a foldable wheelchair. In order to fold the wheelchair it is necessary to completely remove all of the components of the exercising device. This is not only time consuming, but again militates against its use.

U.S. Pat. No. 2,630,332 dated Mar. 3, 1953 discloses a vehicle for invalids and which utilizes a crank mechanism which is foot operated and a crank mechanism which is hand operated. This type of device may be moderately effective for patients who have slight disabilities but does not overcome many of the problems inherent in the prior art devices as mentioned above.

U.S. Pat. No. 4,572,501 to Durham et al also discloses an exercising device for attachment to the frame of a wheelchair. Here again, this exercising device does not overcome many of the problems inherent in the prior art devices, as previously described. While the device in the Durham et al patent does permit propelling movement, the device is difficult to attach to the wheelchair and is time consuming and requires considerable manual effort to both attach and remove the device from the frame of the wheelchair.

U.S. Pat. No. 2,533,728 to Gedat etal discloses a velocipede which includes both a hand crankable mechanism and a foot crankable mechanism. Either or both of these devices may be simultaneously operated for propelling the velocipede.

OBJECTS OF THE INVENTION

It is, therefore, one of the primary objects of the present invention to provide an exercising device which is readily and quickly attachable to the frame of a wheelchair and which is easily removable therefrom.

It is another object of the present invention to provide an exercising device of the type stated which can be used for purposes of exercising and which can also be easily adapted for enabling propelling movement of the wheelchair during exercising activity.

It is a further object of the present invention to provide an exercising device of the type stated which is constructed so that the exercising device may remain on the frame of the wheelchair even when the wheelchair is folded for storage and unfolded for use.

It is an additional object of the present invention to provide an exercising device of the type stated which utilizes a unique connecting means and which enables the exercising device to be easily moved away from the front of the frame of the wheelchair to permit easy entry into and exit from the wheelchair.

It is still another object of the present invention to provided an exercising device of the type stated which is highly effective in operation and which can be constructed at a relatively low cost.

With the above and other objects in view, my invention resides in the novel features of form, construction, arrangement and combination of parts presently described and pointed out in the claims.

BRIEF SUMMARY OF THE DISCLOSURE

An exercising device for attachment to the frame of a wheelchair. The exercising device comprises a cross-bar which is extendable laterally across the frame of the wheelchair. The cross-bar is preferably comprised of a first cross-bar section and a second cross-bar section which are pivotably connectable intermediate their ends. Moreover, the connection of the cross-bar is preferably a pivotal connection so that the cross-bar can remain on the wheelchair permitting folding of the wheelchair for collapse and storage and also permitting unfolding of the wheelchair for use.

An attachment mechanism is provided on the end of each of the ends of the cross-bars. The attachment mechanism comprises a tubular frame structure which somewhat conforms to the frame of the wheelchair and is adapted for clamping to the frame of the wheelchair. Moreover, the attachment mechanisms are releasable such that the cross-bar may be readily and easily removed from the frame of the wheelchair.

The exercising device comprises a crankable assembly which generally includes a pair of vertically disposed upright plates. An axle extends through these plates proximate the lower end thereof. A wheel is mounted on the axle and is the element which is rotated to provide the exercising for the user of this exercising device. A first crank mechanism is connected to the axle of the wheelchair and is foot operated so that when rotated, it will cause rotation of the wheelchair. A second crank mechanism is also provided proximate the upper end of the pair of plates and is hand operated for causing a crankable movement of the wheel. In this case, the hand operated crank may be connected to the axle by means of a sproket on the axle and a separate pivotal shaft holding the hand crank and with a sproket chain extendable therebetween.

A connecting means is provided for connecting the cross-bar to the crankable assembly. This connecting means includes an arm which is pivotally connected at one end to the cross-bar. Moreover, the arm is adapted for pivotal connection at its opposite end to the crankable assembly.

This invention possesses many other advantages and has other purposes which may be made more clearly apparent from a consideration of the forms in which it may be embodied. These forms are shown in the drawings forming a part of and accompanying the present specification. They will now be described in detail for the purposes of illustrating the general principles of the invention, but it is to be understood that such detailed description is not to be taken in a limiting sense.

BRIEF DESCRIPTION OF THE DRAWINGS

Figure 1:
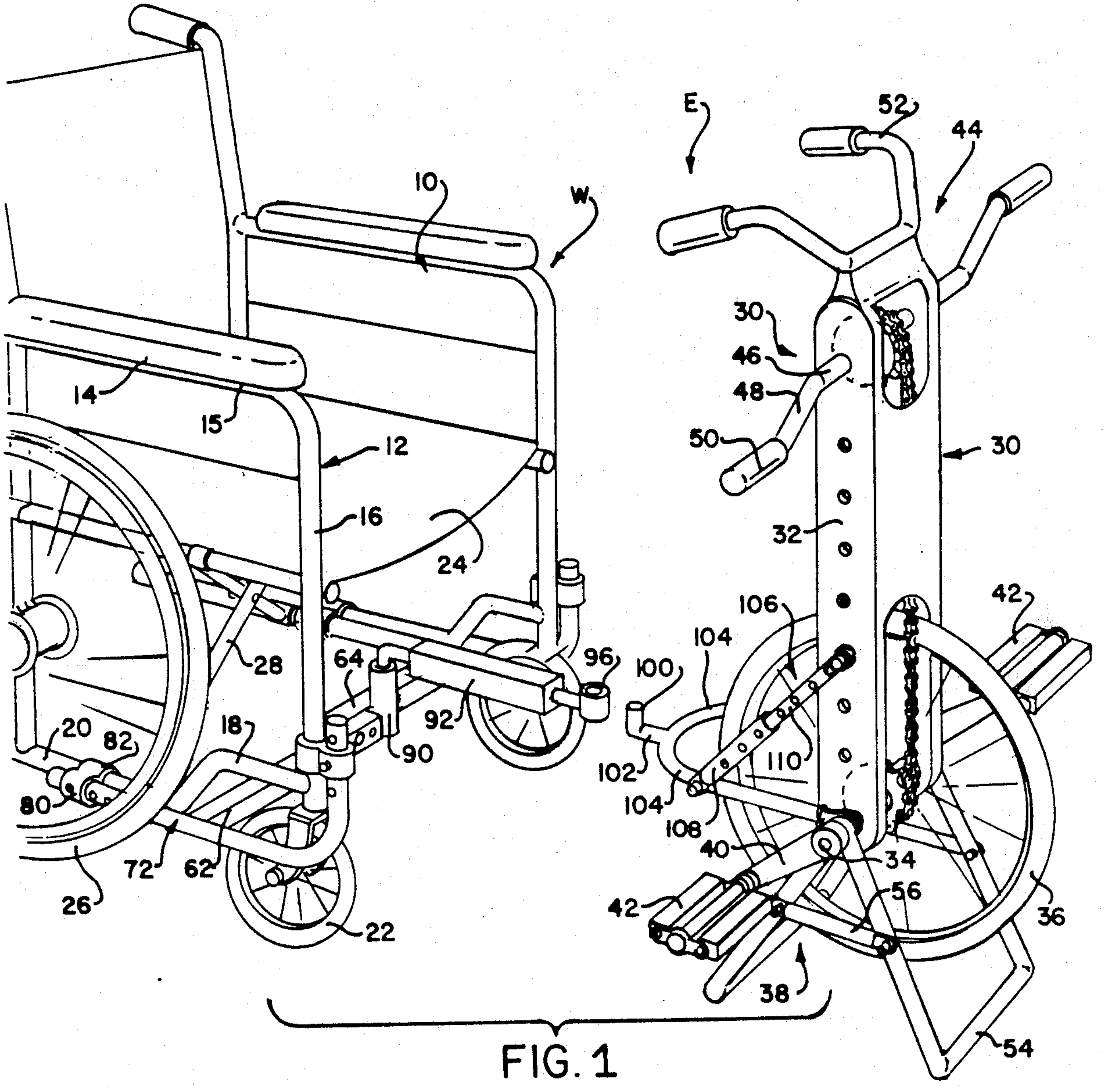
Figure 2:
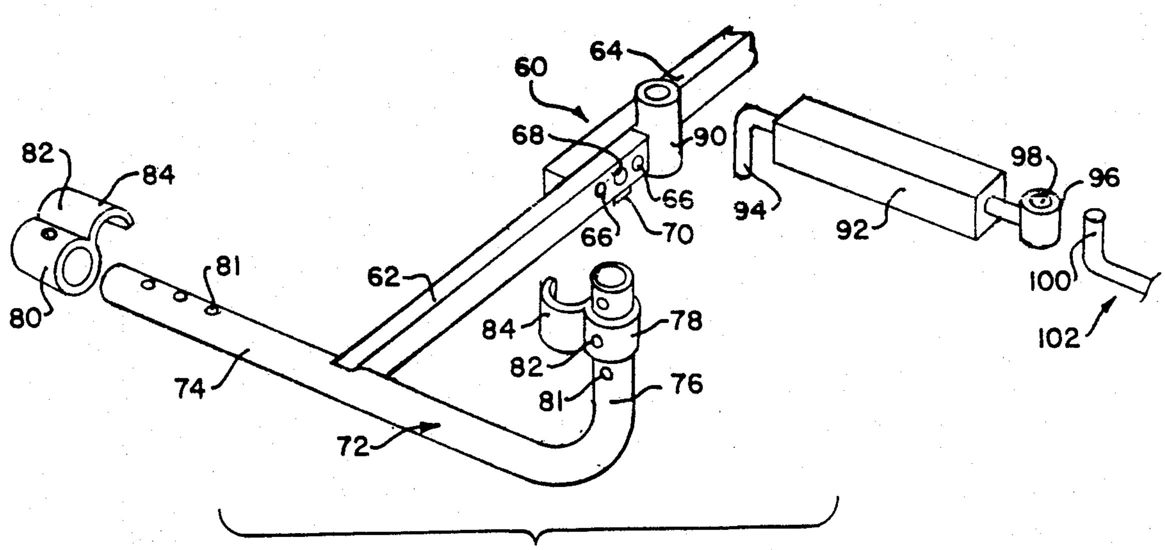
Figure 3:
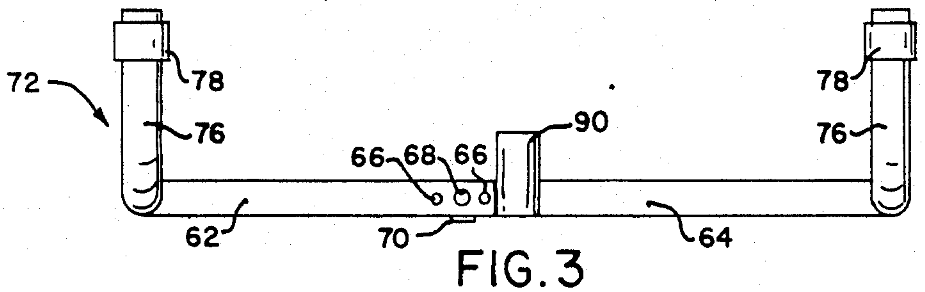
Figure 4:
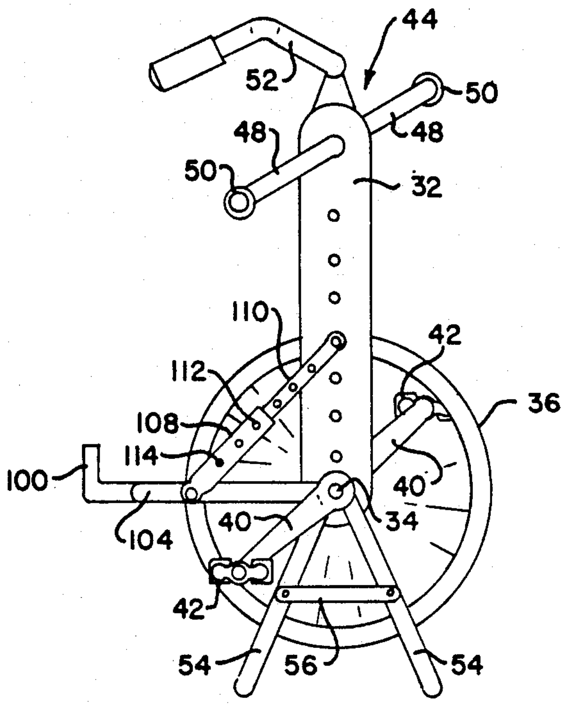

Having thus described the invention in general terms, reference will now be made to the accompanying drawings in which:

FIG. 1 is a perspective view of an exercising device constructed in accordance with and embodying the present invention and showing attachment thereof to a frame of a wheelchair;

FIG. 2 is an exploded fragmentary perspective view showing a portion of the connecting mechanism for connecting a crankable assembly of the exerecising device to the frame of the wheelchair;

FIG. 3 is a front elevational view of a cross-bar and attachment mechanism forming part of the exercising device of the present invention;

FIG. 4 is a side elevational view of a portion of the exercising device constructed in accordance with and embodying the present invention.

Figure 5:
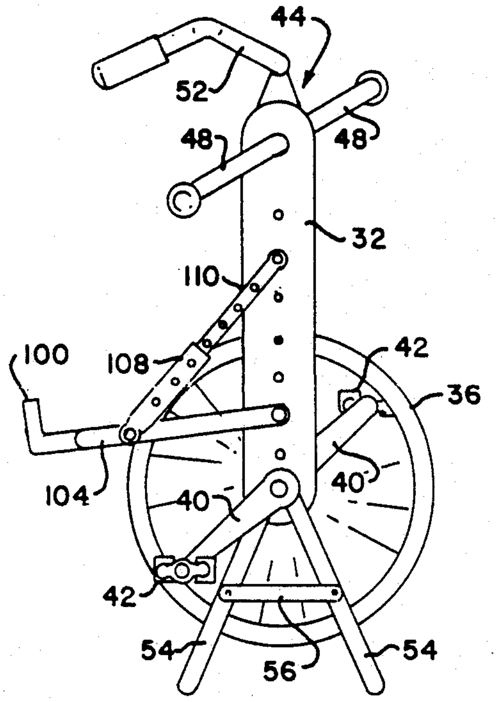
Figure 6:
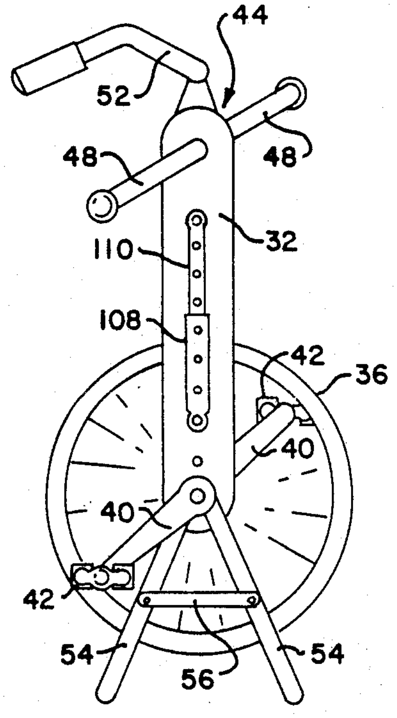

FIG. 5 is a side elevational view, similar to FIG. 4, and showing an alternate arrangement of attaching th e exercising device to the frame of the wheelchair; and FIG. 6 is a side elevational view, similar to FIGS. 4 and 5, and showing alternate arrangement in which the exercising device is not attached to the frame of the wheelchair, but is used as a stand alone device.

DETAILED DESCRIPTION OF A PREFERRED EMBODIMENT

Referring now in more detail and by reference characters to the drawings which illustrate a preferred embodiment of the present invention, E designates an exercising device which is adapted for attachment to the frame of a wheelchair W. For purposes of more fully appreciating the invention, a brief description of the wheelchair is set forth.

The wheelchair W, itself, is generally conventional in construction and comprises a pair of vertically arranged, spaced apart side frames 10 and 12. These side frames each include horizontally disposed arm rests 14 and vertically disposed legs 16. Moreover, the vertically disposed legs 16 are connected through a somewhat arcuate section 18 into base rails 20. Connected to the vertically arranged side frames 10 and 12 are front wheel assemblies 22 which are essentially conventional in their construction. The rails 20 are connected to a back portion of a wheelchair which also carries a seat 24. In like manner, diametrically enlarged rear wheels 26 are provided on the frame of the wheelchair for driving the wheelchair.

Many of the conventional wheelchairs are non-collapsable and include intermediate rigid frame members. However, some of the conventional wheelchairs include intermediate cross-bars 28 which permit collapsing of the wheelchair itself. Thus, the two side frames 10 and 12 are capable of being moved toward each other in juxtaposition when collapsed for purposes of storage and transport. In like manner, they are capable of being spread apart, in the manner as illustrated in FIG. 1 for use.

The exercising device E of the present invention generally comprises an upright structure 30 comprised of a pair of spaced apart generally vertically disposed plates 32. The vertically disposed plates 32 may be connected by front and back plates 34 to thereby form a somewhat enclosed housing. The plates 32 may be further reinforced by means of transversely extending plates (not shown), if desired or required for structural integrity.

Located adjacent the lower end of the upright structure 30 is an axle 34 and mounted on the axle 34 is a driven wheel 36. Spokes which connect to the frame of the wheel 36 to the axle hub have been largely eliminated in the drawings for purposes of clarity. The axle 34 is journaled in bearings (not shown) mounted in the upright plates 32. The axle 34 is also provided with legs 40 which are perpendicularly arranged to the axis of the axle 34 and offset extensions on each of the opposite sides thereof to constitute a first crankable mechanism 38. This first crankable mechanism 38 comprise a pair of foot pedals 42 which are mounted on the offset extensions of the axle 34, in the manner as illustrated. Thus, the user of the exercising device may cause rotation of the wheel 36 by cranking the axle through the foot pedals 42.

The exercising device of the present invention also includes a hand operated crank assembly 44. This crank assembly 44 also includes a shaft 46 which extends between the pair of upright plates 32 and is journalled in bearings (not shown) located within the plates 32. The shaft 46 also includes vertically legs 48 perpendicularly arranged to the axis of the shaft 46 and mounted on each of the oppositely located legs 48 are extension hand grips 50. In this way, the user of the exercising device may also cause rotation of the driven wheel 36 through cranking of the hand grips 50.

A conventional handlebar 52 may be mounted on the upper end of the upright structure in order for the user to engage the handlebar if the user is attempting to either propel or exercise with the exercising device only by means of the crank assembly 38.

A pair of oppositely disposed stands 54 are also mounted on the upright 32, in the manner as illustrated in FIGS. 1 and 4 of the drawings. Each of the stands 54 are generally triangular in shape, in the manner as illustrated in FIG. 1. The stands 54 and are pivotally mounted on the axle 34 and are generally collapsable relative to one another. Thus, each stand 54 may be moved to a position as illustrated in FIG. 1 where they are capable of supporting the wheel 36 in a position spaced above the ground or above the floor or other ground surface. The stands 54 are also moveable to a position where the stands are located out of the way such that they are generally parallel to the ground, and permit the wheel 36 to be disposed in engagement with the ground. When the wheel 36 is located in the position as illustrated in FIG. 1, the exercising device, itself, is only adapted for purposes of exercising. Thus, the user of the device will attempt to rotate the wheel 36 against its own inertia, either through the hand crankable mechanism 44 or the foot crankable mechanism 38. When the wheel 36 is lowered into engagement with the ground or other floor surface, then the user of the exercising device may literally propel the wheelchair by causing a cranking movement of the wheel 36.

A cross-arm 56 is pivotally mounted on one end of each of the stands and is connectable to the opposite end thereof of the other of the stands. In this way, the stands may be comprised of U-shaped bars which are capable of being moved toward one another, to the position illustrated in FIG. 1, and connected by the cross-arm 56. This will hold the stands in the position shown in FIG. 1. When the cross-arm 56 is disconnected from one of the bars, they will be capable of being moved in a position such that they are generally horizontally disposed and permit the wheel 36 to be lowered into engagement with the ground or other supporting surface.

The exercising apparatus of the present invention also comprises a cross-bar 60 which is adapted to be attached the frame of the wheelchair. The cross-bar 60 comprises a first cross-bar section 62 and a second cross-bar section 64. The cross-bar sections 62 and 64 are adjustably connectable intermediate their ends, in the manner as more fully illustrated in FIGS. 2 and 3 of the drawings. For this purpose, each of the inner ends of the cross-bars overlap one another. Moreover, each of the cross-bars are provided with apertures 66 capable of being aligned. A pin or similar locking element 68 may be located in one of the pairs of the aligned apertures 66 for purposes of pivotally connecting each of the cross-bar sections 62. A plate 70 may be mounted on one of the cross-bar sections for engaging the lower edge of the opposite of the cross-bar sections. In this way, the cross-bar sections 62 and 64 can be pivoted relative to one another but they cannot fall below a true horizontal arrangement with respect to each other as illustrated in FIG. 2.

On each of their opposite ends, the cross-bars 62 and 64 are provided with an attachment frame 72. Each attachment frame 72 is essentially identical in construction and therefore, only one of such attachment frames will be described in detail herein.

The attachment frame 72 is generally comprised of a generally horizontally disposed section 74 and an angularly located and preferably generally vertically dispôsed section 76 which is integrally connected thereto. The sections 74 and 76 preferably form, or are formed by, a continuous pipe which is bent at essentialy a right angle, in the manner as illustrated in FIG. 2. Mounted on the upper end of the vertically disposed leg of the attachment mechanism 72 is a first clamp 78. In like manner, mounted on the opposite end of the leg 74 is a second clamp 80. In this case, each of the legs 74 and 76 are provided with apertures 81 capable of being aligned with a fastener receiving aperture 82 in each of the clamps. In this way, it can be observed that the clamps 78 and 80 can be adjustably positioned on the respective legs 74 and 76.

The clamps 78 and 80 each comprise a ring structure capable of being concentrically disposed over the tubular frame portion of the attachment means. Further, each include an arcuately shaped clamp-like arm 84 which is capable of being disposed about and engaging a portion of the pipe section forming a part of the wheelchair frame. Each of these arcuately shaped arms 84 may be secured to the frame of the wheelchair by any suitable attachment means, as for example, by machine screws or the like. In this way, it can be observed that the entire cross-bar assembly is easily attachable to the wheelchair and also readily removable from the wheelchair. Moreover, it can remain on the wheelchair so that the wheelchair can be collapsed and stored and reopened without requiring any removal thereof.

Mounted on one of the cross-car sections 62 or 64 in the manner as illustrated in FIG. 2 is a socket 90 which is adapted to pivotally receive a connecting arm 92. In this case, the socket 90 is preferably located midway between the ends of each of the arm sections 62 and 64. The connecting arm 92 is provided with a pivotal connecting end at its left-hand end, reference being made to FIG. 2, which connecting end exists in the nature of a pin 94 capable of being disposed within the socket 92. At its opposite end, the connecting arm 92 is provided with a socket 96 having a vertically disposed aperture 98. Another pin 100 is adapted to be disposed in the aperture 98 from the lower end thereof, also in the manner as best illustrated in FIGS. 1 and 2 of the drawings.

The pin 100 forms part of an arm structure 102 which is adapted for attachment to the crankable assembly forming part of the exercising device, in the manner as illustrated in FIGS. 1 and 4 of the drawings. The arm structure 102 comprises a pair of laterally spaced apart structural arms 104, which in the embodiment as illustrated, are connected directly to the axle 34. In this respect, the arm structure 102 is preferably telescopically constructed so that the overall dimension between the actual crankable assembly and the wheelchair may be adjusted. In addition, an adjustable strut 106 is connected between the arm structure 104 and the upright plates 32. The adjustable strut 106 is comprised of a first strut section 108 and a telescopically located second strut section 110. These strut sections 108 and 110 may be adjusted to a selected length and locked by means of a pin 112 inserted into alignable apertures 114 in each of the strut sections 108 and 110.

By further reference to FIG. 5, it can be observed that it is not necessary to connect the arm structure 102 directly to the axle 34 extending through the vertically disposed plates 32. Rather, the right hand ends of the arm structure 102 could remain free and then the arm structure 102 can be connected directly to the vertically disposed upright plates 32 directly through the telescoping struts 108 and 110. In the arrangement as illustrated in FIG. 5, the arm structure 102 is connected at one end to the vertically disposed plates 32 and the connecting struts 106 and 108 are connected to the arm structure 102 and to the vertically disposed plates 32 at a point above the respective connections illustrated in FIG. 4. In this respect, the arm structure 102 as well as a telescoping struts 106 and 108 could be essentially connected at any desired location on the upright structure 30. Thus, as an example, the upper strut section 110 could be connected to the uppermost of the apertures in the plates 32.

The exercising apparatus of the present invention may operate as a stand-alone structure, that is, it may be used independently of the wheelchair, as best illustrated in FIG. 6. For this purpose, a user may sit in any standard chair and operate either the foot operated crank assembly or the hand crank assembly, as previously described. In this way, the exercising apparatus is highly useful for those individuals who are not necessarily restricted to the use of a wheelchair for mobility. However, and in this case, the entire arm structure 102 should be removed when the exercising apparatus is used as a stand-alone structure. For this purpose, the arms 104 could be connected to the axle 34 by any releasable connecting means.

When the exercising apparatus of the present invention is used as a stand-alone unit, it would be preferable to locate the legs of the stand in a greater spaced apart relationship, than illustrated, for greater stability. Moreover, a different stand construction may be employed for greater stability. However, the exact details of the stand itself are conventional and not necessarily critical to the present invention. It is however, important that the stand be capable of being moved out of the way so that the driving wheel can be located into contact with the ground when the exercising device is to be used as a propelling mechanism.

It can be observed that the exercising device of the present invention provides a wide degree of utility in that the crankable mechanism as illustrated in FIG. 1 could be easily swung out of the way of the front of the wheelchair. This clearly and easily facilitates entry of a patient into the wheelchair and exit of the patient from the wheelchair without the necessary removal of the crankable assembly. However, if desired, the crankable assembly could be easily disconnected and reconnected since there is only the necessity of disconnecting one pivotal connection.

The crankable assembly is also constructed so that stands may be located on the ground surface for supporting the wheel to enable an exercising activity without propelling of the wheelchair. In like manner, the stands can be moved out of the way to permit engagement of the wheel 36 with the floor or other ground surface to permit a propelling movement. For purposes of enabling a propelling movement of the wheelchair with the crankable assembly, one or both of the sockets 90 and 96 may be provided with a lock to prevent rotations of the pin inserted therein.

The exercising apparatus of the present invention may also be provided with a hand brake mechanism for direct connection to the driving wheel of the apparatus. The hand operated brake provides a means of braking the speed of the combination of the wheelchair and exercising apparatus when the latter is used as a propelling mechanism.

It may also be desirable to include other additional features, as for example, a speedometer or the like on the exercising apparatus. In this way, the speedometer could be used to provide an indication of the speed when the exercising apparatus is used as a propelling mechanism. Otherwise, it can be used as a means for determining the amount of exercising activity. Furthermore, a means for adjusting the amount of tension on the driving wheel of the exercising apparatus could be employed. The amount of tension and for that matter, frictional effects imposed on the wheel can be adjusted in accordance with mechanisms normally provided for conventional exercising apparatus of the type often referred to as "Exercycles".

In addition to the foregoing, the exercising apparatus of the present invention is also highly effective in enabling a caretaker or other assistant to assist the user of the exercising apparatus. In many cases, the user may be partially disabled or may not have sufficient strength in his or her arms or legs to properly use the exercising apparatus. However, movement is still necessary in the disabled limbs in order to maintain proper blood circulation and in order to exercise the cardiovascular system. For this purpose, the user's feet may be placed on the foot pedals 42 and the attendant or assistant would turn the hand operated crank assembly 44. In this way, the user's legs would be moved and exercised. Alternately, the hands of the user could be placed on the hand operated crank assembly 44 and the attendant could cause movement of that assembly by operating the foot operated crank assembly through the foot pedals 42.

It should also be understood that the apparatus of the present invention would be provided with a suitable electric motor or similar powered drive means. In this way, the powered drive means could be used to cause rotation of the driven wheel 36. This would also cause rotation of both the foot operated crank assembly and the hand operated assembly. If the user's hands and/or feet were properly placed on these crank Oassemblies, the arms and/or legs of the user would also be suitably exercised.

The exercising apparatus of the present invention is also highly effective in that it is capable of being rapidly assembled and disassembled for purposes of use and for storage. Moreover, it can be disassembled into a number of relatively small components which facilitates storage and transport. Even when in the assembled and standing condition, the exercising apparatus is also relatively small and only consumes a minimum amount of space. As a simple example, in one embodiment, the entire width of the exercising apparatus is only about 18 inches and the entire height is only about 25 inches. Furthermore, the exercising apparatus is effective in that it is capable of being adjustably positioned with respect to a wheelchair in order to accommodate the size of the arms and legs of the user.

The exercising apparatus is also effective in that it is not only capable of being used with people confined to wheelchairs, but it is also capable of being used by others. Moreover, it can effectively serve as an exercising apparatus for individuals who have no disability whatsoever for purposes of exercising. Thus, the same device can be used as both an exercising apparatus for the disabled and partially disabled and for those who have no disabilities.

Thus, there has been illustrated and described a unique and novel exercising device for attachment to a wheelchair and which is constructed so that an attachment position may remain on the wheelchair and which permits collapsing of the wheelchair, and which is also capable of being moved away from the front of the frame of the wheelchair in order to permit exit and entry thereof. The exercising device is also uniquely constructed so that it can be easily and quickly removably attached to the frame of the wheelchair. Thus, the exercising device of the present invention fulfills all of the objects and advantages which have been sought therefore. It should be understood that many changes, modifications, variations and other uses and applications will become apparent to those skilled in the art after considering this specification and the accompanying drawings. Therefore, any and all such changes, modifications, variations, and other uses and applications which do not depart from the spirit and scope of the invetion are deemed to be covered by the invention which is limited only by the following claims.

Having thus described the invention, what I desire to claim and secure by Letters Patent is:

1. An exercising device for attachment to the frame of a wheelchair, said device comprising:

(a) a cross-bar extendable laterally across the frame of a wheelchair and being comprised of first and second coss-bar sections, (b) attachment means at each end of said cross-bar for releasable attachment to the frame of the wheelchair, (c) a crankable assembly comprised of a driven wheel and a crank mechanism capable of turning the wheel in the assembly when cranked and which will thereby enable exercising by turning of the wheel, (d) a connecting arm arrangement extending between the crankable assembly and the cross-bar, (e) pivotal connecting means on the cross-bar and on the crankable assembly for pivotal and releasable connection to the connecting arm arrangement, (f) pivot means intermediate the ends of the cross-bar and in close proximity to said connecting means permitting pivotal connection of the first and second cross-bar sections and thereby permitting collapsing of the wheelchair.

2. The exercising device of claim 1 further characterized in that said pivotal connecting means enables pivotal connection of the crankable assembly to the crossbar to enable the crankable assembly to be shifted to a position away from the front of a wheelchair.

3. The exercising device of claim 2 further characterized in that said connecting arm arrangement comprises a connecting arm which is pivotally connected to the cross-bar and which is also connected to said crankable assembly.

4. The exercising device of claim 1 is further characterized in that said attachment means comprises a first leg for attachment to one portion of a frame of the wheelchair and a second angularly located leg for attachment to another portion of a frame of the wheelchair, and clamping means on said attachment means for releasably attaching the cross-bar to the frame of the wheelchair.

5. The exercising device of claim 1 further chracterized in that said crankable assembly is a hand crankable assembly.

6. The exercising device of claim 1 further characterized in that said crankable assembly is a foot crankable assembly.

7. The exercising device of claim 1 further characterized in that said crankable assembly is a combination of a hand crankable and a foot crankable assembly.

8. A device for connection to a wheelchair to enable exercising by a user of the wheelchair or to enable propelling of the wheelchair, said device comprising:

(a) a generally upright structure, (b) an axle mounted in said upright structure, (c) a driven wheel mounted on said axle for rotation, (d) a hand operated crank mechanism on said generally upright structure and being operativelyconnected to said axle for causing rotation of a said wheel when cranked, (e) a foot operated crank mechanism on said generally upright structure and being operatively connected to said axle for causing rotation of said wheel when cranked, (f) means for raising said wheel for free rotation to enable exercising by operating one or both of said crank mechanisms and lowering said wheel into a ground surface for causing propelling movement of the wheelchair, and (g) connecting means for releasably connecting said device to the wheelchair, said connecting means being adjustably positionable on said generally upright structure to adjust the angle of the generally upright structure about the axle with respect to the wheelchair.

9. The exercising device of claim 8 further characterized in that said means for raising and lowering comprise a stand which is capable of being shifted into a position where it raises said wheel and to a position where it permits lowering of said wheel to a floor surface.

10. The exercising device of claim 9 further characterized in that said stand comprises a pair of spaced apart stand members which are capable of being collapsed.

11. The exercising device of claim 10 further characterized in that said spaced apart stand members are pivotally mounted on said axle.

12. The exercising device of claim 9 further characterized in that said foot operated crankable assembly is connected directly to said axle.

13. The exercising device of claim 12 further characterized in that said hand operated crank assembly is connected to said axle through a connecting chain drive.

14. The exercising device of claim 8 further characterized in that said generally upright structure comprises a pair of spaced apart vertically disposed plates.

15. The exercising device of claim 8 further characterized in that said connecting means comprises a connecting arm having one end adapted for pivotal connection to said upright structure.

16. The exercising device of claim 15 further characterized in that said connecting means has its opposite end operatively adapted for pivotal connection to a wheelchair.

17. A connecting assembly for connecting an exercising device to a wheelchair, said connecting assembly comprising:

(a) a cross-bar provided for transverse location across a portion of a frame of a wheelchair, (b) means associated with said cross-bar to enable adjustment of the transverse dimension of said cross-bar to enable fitting to different sized wheelchairs, (c) first means intermediate the ends of said cross-bar to enable two sections of said cross-bar to be pivotal intermediate its ends and thereby enable collapsing of said wheelchair when said cross-bar is attached, (d) a connecting arm having a first pivotal connecting means at one end for pivotal connection to said cross-bar and a second pivotal connecting means for pivotal connection to an exercising device, and (e) attachment means on each of the ends of said cross-bar for releasable attachment to a frame of the wheelchair.

18. The connecting assembly of claim 17 further characterized in that said cross-bar comprises first and second cross-bar sections and said means to enable adjustment is located centrally of the ends of said sections.

19. The exercising device of claim 18 is further characterized in that said attachment means comprises a first leg for attachment to one portion of a frame of the wheelchair and a second angularly located leg for attachment to another portion of a frame of the wheelchair, and clamping means on said attachment means for releasably attaching the cross-bar to the frame of the wheelchair.

20. A device for connection to a wheelchair to enable exercising by a user of the wheelchair or to enable propelling of the wheelchair, said device comprising:

(a) a generally upright structure, (b) an axle mounted in said upright structure, (c) a driven wheel mounted on said axle for rotation, (d) a hand operated crank mechanism on said generally upright structure and being operatively connected to said axle for causing rotation of said wheel when cranked, (e) a foot operated crank mechanism on said generally upright structure and being operatively connected to said axle for causing rotation of said wheel when cranked, (f) means for raising said wheel for free rotation to enable exercising by operating one or both of said crank mechanisms and lowering said wheel into a ground surface for causing propelling movement of the wheelchair, said means for raising comprising a stand having a pair of stand members on opposite sides of said wheel for supporting said device as a stand alone unit independently of a wheelchair, and (g) connecting means for releasably connecting said device to the wheelchair.

21. The exercising device of claim 20 further characterized in that said spaced apart stand members are capable of being collapsed.

22. The exercising device of claim 21 further characterized in that said spaced apart stand members are pivotally mounted on said axle.

* * * * *